(12) United States Patent
Cheng et al.

(10) Patent No.: US 9,088,456 B2
(45) Date of Patent: Jul. 21, 2015

(54) ANTENNA SELECTION SCHEME BASED ON INFORMATION BITS

(75) Inventors: Jung-Fu Cheng, Fremont, CA (US); Yang Hu, Beijing (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 31 days.

(21) Appl. No.: 13/641,788

(22) PCT Filed: Apr. 18, 2011

(86) PCT No.: PCT/IB2011/051678
§ 371 (c)(1),
(2), (4) Date: Oct. 17, 2012

(87) PCT Pub. No.: WO2011/132136
PCT Pub. Date: Oct. 27, 2011

(65) Prior Publication Data
US 2013/0034181 A1     Feb. 7, 2013

Related U.S. Application Data

(60) Provisional application No. 61/326,062, filed on Apr. 20, 2010.

(51) Int. Cl.
| H04L 1/02 | (2006.01) |
|---|---|
| H04L 25/03 | (2006.01) |
| H04B 7/06 | (2006.01) |
| H04L 25/06 | (2006.01) |

(52) U.S. Cl.
CPC ............. *H04L 25/067* (2013.01); *H04B 7/061* (2013.01); *H04L 25/03331* (2013.01); *H04L 2025/03426* (2013.01)

(58) Field of Classification Search
CPC ................................ H04L 1/0618; H04L 1/06
USPC ........... 375/267, 295, 299, 340, 347; 455/101
See application file for complete search history.

(56) References Cited

U.S. PATENT DOCUMENTS

| 2006/0153312 A1* | 7/2006 | Yun et al. ...................... 375/267 |
|---|---|---|
| 2006/0193396 A1 | 8/2006 | Li |
| 2006/0209667 A1 | 9/2006 | Li |
| 2008/0075196 A1* | 3/2008 | Kim et al. ..................... 375/299 |

* cited by examiner

*Primary Examiner* — Khai Tran

(57) ABSTRACT

A method, transmitter node, and receiver node for communicating a transport block of information bits from the transmitter node to the receiver node are provided. The transmitter node encodes the information bits and divides the coded bits into antenna selection bits and modulation bits. The antenna selection bits are used to select a transmit antenna from a plurality of transmit antennas. The modulation bits are used by a modulator to select modulation symbols for transmission utilizing the selected antenna. The receiver node receives the radio signal with a front-end receiver and computes a plurality of combined signals, each corresponding to one hypothesized transmit antenna at the transmitter node. The receiver forwards the plurality of combined signals to a soft value computer, which computes soft values for the antenna selection and modulation bits. The soft values are combined and decoded to produce decision bits for recovering the transport block.

9 Claims, 4 Drawing Sheets

ANTENNA SELECTION SCHEME BASED ON INFORMATION BITS

RELATED APPLICATIONS

This application claims the benefit of U.S. Provisional Application No. 61/326,062, filed Apr. 20, 2010, the disclosure of which is fully incorporated herein by reference.

TECHNICAL FIELD

The present invention relates generally to communication systems, and more particularly, to a system and method for open-loop space-frequency-time coding for multiple-input multiple-output (MIMO) radio communication systems.

BACKGROUND

Open-loop MIMO diversity coding techniques are widely adopted in wireless communication systems to enhance transmission reliability. Orthogonal transmit diversity (OTD) and orthogonal space-time (OST) coding are two conventional approaches of particular effectiveness. Hybrid combinations of both are also possible.

Frequency hopping, which is utilized in both LTE and GSM systems, is a primary example of an OTD coding technique. Another OTD coding example can be found in the antenna switching option of the LTE uplink.

Regarding OST, for two transmit antenna ports, the OST coding approach is adopted as the space-frequency block coding (SFBC) in the LTE system. More specifically, the transmitted signal is based on the following encoding matrix taken from 3GPP TS 36.211 V8.6.0 (200903):

$$2\ TX\ \text{scheme}\ (SFBC): \begin{bmatrix} X_1 & X_2 \\ X_2' & -X_3' \end{bmatrix}$$

where $\{X_1, X_2\}$ are input symbols. Based on the orthogonal design theory described by V. Tarokh et al. in "Space-time block codes from orthogonal designs," IEEE Transactions on Information Theory, vol. 45, no. 5, July 1999, this SFBC coding scheme can fully exploit transmit diversity from the two transmit antennas regardless of the underlying modulation and coding scheme (MCS) adopted for the input symbols. This SFBC coding scheme is also known as the Alamouti scheme based on the paper by S. V. Alamouti entitled, "A simple transmit diversity technique for wireless communications," IEEE J. Sel. Areas Comm., vol. 16, no. 8, pp. 1451-1458, October 1998. In practical terms, the diversity benefits lead to steeper Block Error Rate (BLER) or Bit Error Rate (BER) curves when compared to those for conventional single transmit antenna transmission.

However, for systems with more than two transmit antennas, the theory also concludes that such full-diversity coding does not exist. Hence, for the case of four transmit antenna ports, a hybrid of the OST and OTD coding approaches is adopted in the LTE system. More specifically, the transmitted signal is based on the following encoding matrix also taken from 3GPP TS 36.211 V8.6.0 (2009-03):

$$4\ TX\ \text{scheme}\ (SFBC+TSFD): \begin{bmatrix} X_1 & X_2 & 0 & 0 \\ 0 & 0 & X_3 & X_4 \\ X_2' & -X_1' & 0 & 0 \\ 0 & 0 & X_4' & -X_3' \end{bmatrix}$$

where $\{X_1, X_2, X_3, X_4\}$ are input symbols.

Several weaknesses of the open-loop MIMO coding schemes in LTE have been identified. The receiver of an OST-coded signal relies on perfect cancellation of the cross-interference to achieve the desired transmission performance and reliability. However, two practical factors constrain the achievability of perfect cross-interference cancellation.

First, in low signal-to-noise ratio (SNR) scenarios, channel estimation quality is generally lower. With these non-ideal channel estimates as inputs, an OST receiver leaves a significant amount of cross-interference unaffected in the received signal, which negatively impacts the performance and reliability of the open-loop MIMO transmission.

Second, perfect cross-interference cancellation also requires the actual channel coefficients experienced by the multiple-input symbols to be identical across certain frequency or time intervals. These requirements are not met for highly dispersive channels or for high mobility scenarios. For these cases, the open-loop MIMO transmission performance and reliability is compromised.

From extensive performance analysis, it is found that the performance improvement of the 4TX scheme over the 2TX scheme is not significant even though the transmitter hardware is doubled. Therefore, the hybrid combination of the OST and OTD coding schemes is not very effective in exploiting the full benefits of the extra transmission hardware.

It is also noted that the 4TX scheme in LTE carries the same data throughput as the 2TX scheme. That is, the transmission rates do not explicitly scale up with the amount transmission hardware. In addition, the total transmit power has to be shared by several transmit antennas in the LTE open-loop schemes. This can cause lower power amplifier efficiency and can potentially limit the uplink coverage.

SUMMARY

The present invention provides a system and method for high-performance open-loop space-frequency-time coding for MIMO systems by fully sweeping the spatial diversity. In the embodiments described herein, a novel set of transmitter and receiver signal processing methods are described for enhancing wireless communication reliability and data throughput.

In one embodiment, the present invention is directed to a method of communicating a transport block of information bits from a transmitter node to a receiver node. After encoding the information bits by a channel encoder in the transmitter node, the method includes the steps of dividing the coded bits into a first part comprising antenna selection bits and a second part comprising modulation bits; utilizing the antenna selection bits by an antenna selection unit to select a transmit antenna from a plurality of transmit antennas; utilizing the modulation bits by a modulator to select modulation symbols for transmission; and transmitting the modulation symbols in a radio signal utilizing the selected antenna. In one embodiment, the radio signal is an orthogonal frequency division multiplexed (OFDM) radio signal, which includes a group of N resource elements defined in time and frequency domains, where N is an integer greater than or equal to 1.

The method may also include the further steps of receiving the radio signal by a diversity combining front-end receiver in the receiver node; computing by the receiver, a plurality of combined signals, each combined signal corresponding to one hypothesized transmit antenna at the transmitter node; forwarding the plurality of combined signals to a soft value computer; and computing by the soft value computer, soft values for the antenna selection bits and the modulation bits utilizing the plurality of combined signals.

In another embodiment, the present invention is directed to a transmitter node for transmitting a transport block of information bits to a receiver node, wherein the transmitter node includes a channel encoder for encoding the information bits, a modulator for receiving the coded information bits and selecting modulation symbols, and a transmitter for transmitting the modulation symbols in a radio signal through a transmit antenna. The transmitter node is characterized by means for dividing the encoded bits into a first part comprising antenna selection bits and a second part comprising modulation bits, wherein the antenna selection bits are provided to the transmitter and the modulation bits are provided to the modulator; and an antenna selection unit in the transmitter for utilizing the antenna selection bits to select from a plurality of transmit antennas, a transmit antenna for transmitting the radio signal.

In another embodiment, the present invention is directed to a receiver node for receiving a radio signal from a transmitter node, and for recovering a transport block of information bits from the radio signal, wherein the transmitter node encodes the information bits, divides the coded bits into antenna selection bits and modulation bits, utilizes the antenna selection bits to select a transmit antenna from a plurality of transmit antennas, and utilizes the modulation bits to select modulation symbols for transmission. The receiver node includes a diversity combining front-end receiver and a soft value computer. The diversity combining front-end receiver receives the radio signal; computes a plurality of combined signals, each combined signal corresponding to one hypothesized transmit antenna, and forwards the plurality of combined signals to the soft value computer. The soft value computer receives the plurality of combined signals from the receiver front-end, and computes soft values for the antenna selection bits and the modulation bits utilizing the plurality of combined signals.

In another embodiment, the present invention is directed to a soft value computer for use in a receiver node. The soft value computer includes means for receiving from a diversity combining front-end receiver, a plurality of combined signals, each combined signal corresponding to one hypothesized transmit antenna; and means for computing soft values for the antenna selection bits and the modulation bits utilizing the plurality of combined signals, said soft values being combined prior to decoding by a channel decoder.

With detailed analysis to be provided in the next section, it can be observed that the coding scheme of the present invention, referred to herein as Spatial Sweeping Coding (SSC), has the following advantages against existing MIMO space-time diversity transmission schemes based on the OST and OTD codes:

The SSC coding scheme achieves similar diversity orders as those based on the OST and OTD codes.

The SSC coding is more robust to channel estimation errors since the receiver does not rely on perfect cancellation of cross-interference in the received signals. Consequently, the SSC coding can be adopted for higher dispersive channels and high mobility scenarios.

The SSC coding scheme inherently provides stronger channel coding protection. This feature may also be utilized to transmit a larger transport block over the same amount of radio resources.

The transmit power is not shared by multiple antennas. This feature is useful in overcoming power-limited deployment cases.

It is also noted that the SSC coding scheme can be easily adapted to any MIMO and multi-carrier system in both the downlink and uplink directions because antenna selection and the corresponding optimal decoding algorithm are relatively modular and independent of existing transmission and resource-allocation schemes.

DETAILED DESCRIPTION

Embodiments of the present invention are described herein in the context of a wireless communication system based on orthogonal frequency division multiplex (OFDM) modulation. More specifically, the exemplary embodiments are described based on the Evolved Universal Terrestrial Radio Access (E-UTRA) system, which is also commonly referred to as the Long-Term Evolution (LTE) of the widely deployed WCDMA systems, as described in the 3GPP Technical Specifications, Series 36. It should be clear to those skilled in the art, however, that the present invention may also be applied or adapted to other wireless communication systems.

Figure 1:
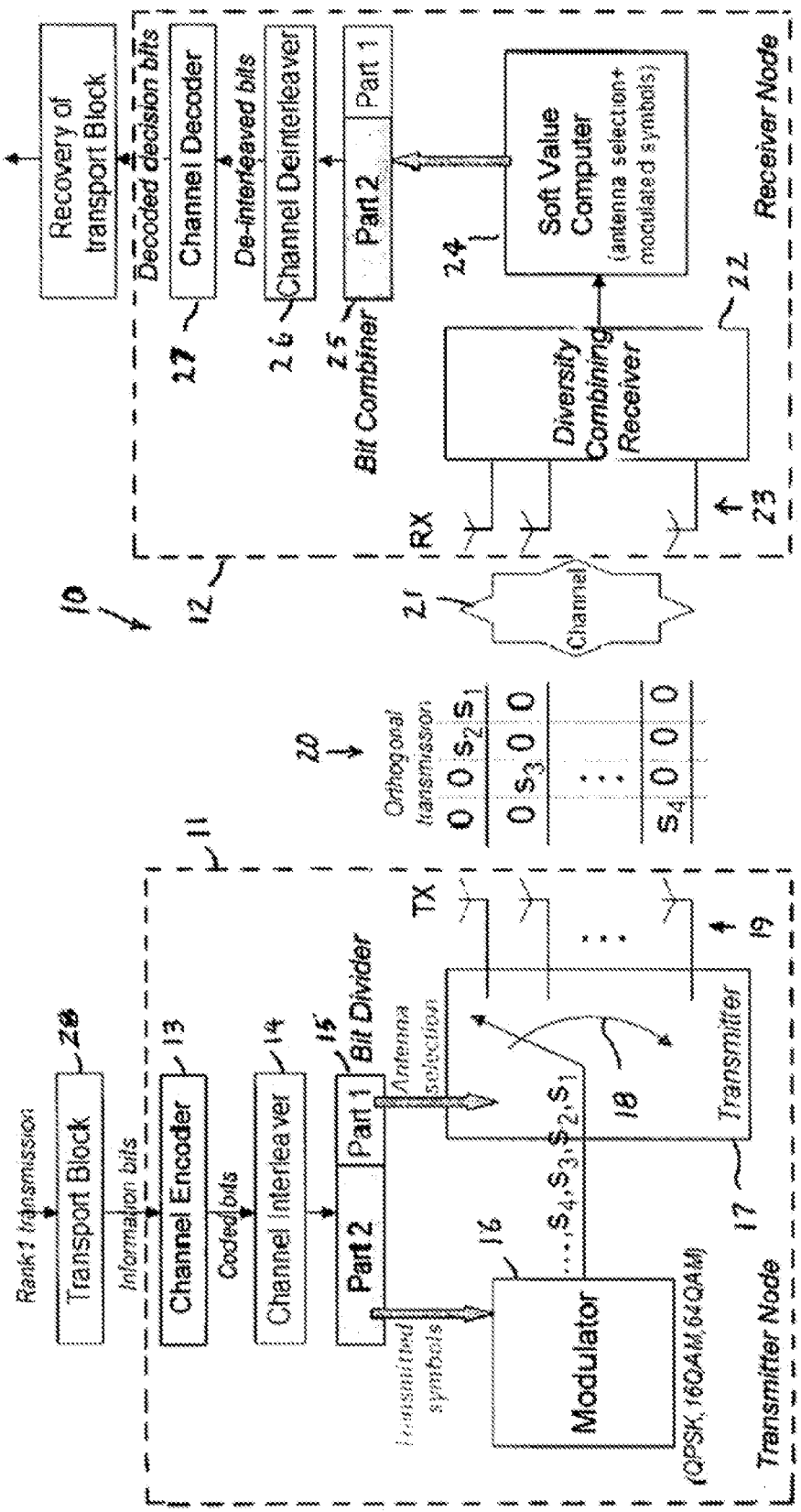
FIG. 1 is a simplified block diagram of an exemplary embodiment of a transmission and reception system in which the Spatial Sweeping Coding (SSC) of the present invention has been implemented.

FIG. 1 is a simplified block diagram of an exemplary embodiment of a transmission and reception system 10 in which the Spatial Sweeping Coding (SSC) scheme of the present invention has been implemented. The system includes a transmitter node 11 and a receiver node 12. The transmitter node includes a channel encoder 13 such as a turbo coder, an optional channel interleaver 14, a bit divider 15, a modulator 16, and a transmitter 17 having an antenna selection unit 18 and multiple transmit antennas 19. The transmitter transmits an orthogonal radio signal 20 over a channel 21 to the receiver node. The receiver node 12 includes a diversity combining front-end receiver 22 having multiple receive antennas 23, a Soft Value (SV) computer 24, a bit combiner 25, an optional channel de-interleaver 26, and a channel decoder 27 such as a turbo decoder.

The transmitter node 11 transmits data in a Transport Block (TB) 28. The channel encoder 13 encodes the TB in a process that may include cyclic-redundancy checks and turbo coding. The coded bits may also be interleaved by the optional channel interleaver 14 to provide further robustness against adverse channel conditions. The bit divider 15 divides the coded bits into two parts, Part 1 and Part 2. Bits belonging to Part 2 are fed to the modulator 16 to select modulation symbols as in a conventional communication system. Bits belonging to Part 1, however, are used by the antenna selection unit 18 in the transmitter 17 to select a transmit antenna 19. Each antenna selection can be applied to a group of N Resource Elements (RE), where N may be greater than 1. Additionally, the group of N REs may be located consecutively or non-consecutively in the frequency domain.

Regarding the receiver node 12, a low-complexity embodiment is shown to include the diversity-combining receiver 22 followed by the SV computer 24. The bit combiner 25 combines the computed soft values for Part 1 and Part 2 of the signal prior to de-interleaving by the optional channel de-interleaver 26. The channel decoder 27 decodes the de-interleaved bits to produce decoded decision bits.

Figure 2:
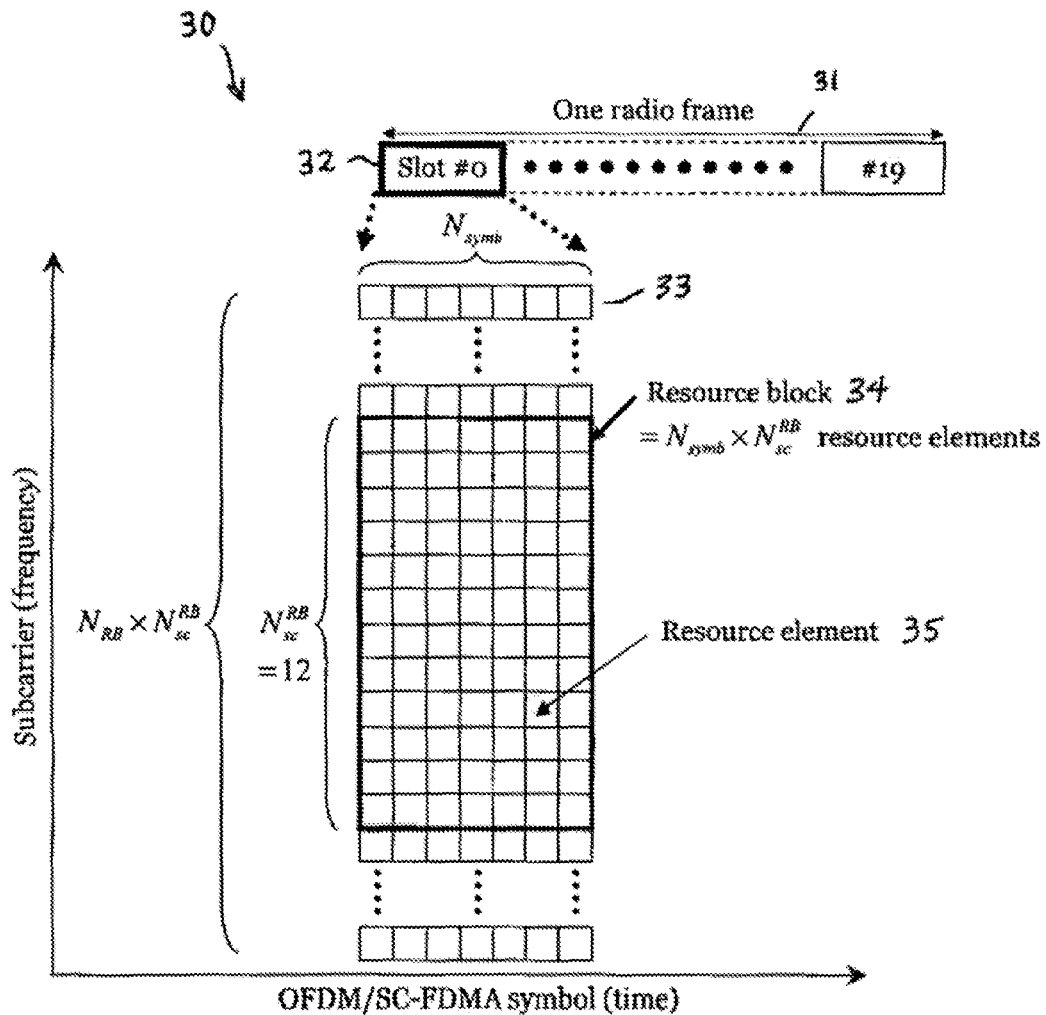
FIG. 2 is an illustrative drawing of an OFDM transmission resource grid.

FIG. 2 is an illustrative drawing of an OFDM transmission resource grid 30. The drawing illustrates subcarrier frequency along the vertical axis and symbol time along the horizontal axis. The drawing illustrates the relationships between a radio frame 31, a slot 32 within the frame, N symbols 33 within the slot, a Resource Block (RB) 34, and a Resource Element (RE) 35 within the RB. $N_{symb}$ is the number of symbols in one slot. $N_{RB}$ is the number of resource blocks in the frequency domain. $N_{SC}^{RB}$ is the number of subcarriers in one Physical Resource Block (PRB). More detailed definitions of the nomenclature utilized in the figure can be found in the 3GPP Technical Specifications Series 36.

In the description below, it is assumed $N_T=2^A$ antennas are available on the transmitter side. A total of M Resource Elements (REs) are allocated for the transmission. The selected modulation alphabet size is $Q=2^B$.

Referring again to FIG. 1, data is provided to the transmitter node 11 in the Transport Block (TB) 28. The channel encoder 13 encodes the TB in a process that may include error detection coding (e.g., cyclic-redundancy check codes) and error correction coding (e.g., turbo codes). Optionally, the coded bits may be interleaved by the channel interleaver 14 to provide further robustness against adverse channel conditions. The bit divider 15 then divides the coded bits into two parts, Part 1 and Part 2.

Bits belonging to Part 2 (referred to as the modulation or the "b" bits) are fed to the modulator 16 to select modulation symbols as in a conventional communication system. For a Q-ary modulation, a group of $B=\log_2 Q$ consecutive bits are used to select one modulation symbol. Since there are M REs, the total number of modulation bits is $M \cdot \log_2 Q$.

Bits belonging to Part 1 (referred to as the selection or the "a" bits) are used by the antenna selection unit 18 in the transmitter 17 to select a transmit antenna 19 out of the $N_T=2^A$ available antennas. Hence, each antenna selection requires $A=\log_2 N_T$ bits.

Significantly, each selected antenna is utilized to transmit an associated group of N REs, where N can be greater than 1. Additionally, the group of N REs transmitted on the same selected antenna may be located in consecutive frequencies, or may be located in non-consecutive frequencies. This disperse placement of different RE groups can provide additional signal reliability through frequency diversity.

Therefore, the total number of selection bits is given by: A·M/N.

An exemplary antenna selection process may be shown with a scenario in which the selection bits comprise bits [1 0 1 1 0 1 . . . ] and there are two transmit antennas [A B]. The process may then select, for a series of RE groups, the sequence of antennas {A, B, A, A, B, A, . . . }, since one bit can select one of the two antennas for each group.

The transmission rate is conventionally measured by two quantities. First, the binary coding rate $r_c$ is defined as:

$$r_c = \frac{\text{total number of information bits}}{\text{total number of coded bits}},$$

and, secondly, the notion of spectral efficiency is defined as:

$$SE = \frac{\text{total number of information bits}}{\text{total number of REs}}.$$

For the SSC scheme, the spectral efficiency can be found to be:

$$SE_{SSC} = \left(1 + \frac{1}{N}\log_Q N_r\right) r_c \log_2 Q.$$

This can be compared to the spectral efficiency of a conventional transmit diversity coding system given by:

$$SE_{convTD} = r_c \log_2 Q.$$

That is, for a given binary coding rate, the SSC achieves higher spectral efficiency than conventional transmit diversity coding. Conversely, for a given spectral efficiency, the SSC can accommodate more coded bits to provide stronger error protection.

The SSC scheme can fully exploit transmit power for each modulated symbol because only one antenna is transmitted at a time. This avoids the case in which multiple antennas share the same power amplifier (PA). The SSC scheme generates orthogonal transmission due to antenna selection, and pure receive diversity can be exploited when multiple antennas are deployed at the receiver. Thus, less accuracy is required of the channel estimation.

On the receiver side, as shown in FIG. 1, the diversity combining front-end receiver 22 is modularly separated from the SV computer 24, which performs robust optimal soft value computations for the antenna selection (a) bits and the modulation (b) bits. This separation enables the smooth introduction of the SSC scheme into existing hardware architectures.

For ease of presentation, an optimal receiver algorithm is derived below for a group of N received REs. As previously noted, this group of N REs can be located consecutively or non-consecutively in the frequency domain.

A bit vector $a=\{0,1\}^A$ determines the transmit antenna for N resource elements out of a set $2^A$ available antennas. The received signal is given by:

$$r_n = h_{a,n} s_{b_n} - w_n, n=0,\ldots,N-1$$

where, for resource element n, $h_{a,n}$ is the channel coefficient vector from transmit antenna a to the $N_R$ receive antennas with $E[\|h_{a,n}\|^2]=N_R E_s$, bits $b_n \in \{0,1\}^B$ determine the modulation symbol with unit average energy $E[|s_{b_n}|^2]=1$ and $w_n$ is the additive Gaussian noise. It is assumed the additive noise is spatially and spectrally uncorrelated: $E[w_n w_m^H]=N_0 \delta_{n,m} I$.

With perfect channel coefficient knowledge $\{h_{a,n}\}$ at the receiver, the joint log likelihood of $\{a,\{b_n\}\}$ is given by:

$$\log Pr(\{r_a\}|a,\{b_n\},\{h_{a,n}\}) = \frac{1}{N_0}\rho(a,\{b_n\}) - \frac{1}{N_0}\sum_{n=0}^{N-1}\|r_n\|^2 - NN_R\log\pi N_0$$

where $$\rho(a,\{b_n\}) = \sum_{n=0}^{N-1}(2\text{Re}\{s_{b_n}^* h_{a,n}^H r_n\} - \|h_{a,n}\|^2|s_{b_n}|).$$

The Log-MAP and Log-MAX soft values for bit $a_m=0,\ldots,A-1$, are given by:

$$\lambda(a_m) =$$
$$\log\sum_{a,\{b_n\}:a_m=1}\exp\left(\frac{1}{N_0}\rho(a,\{b_n\})\right) - \log\sum_{a,\{b_n'\}:a_m'=0}\exp\left(\frac{1}{N_0}\rho(a',\{b_n'\})\right) \approx$$
$$\frac{1}{N_0}\left[\max_{a:a_m=1}\rho(a) - \max_{a:a_m=0}\rho(a')\right]$$

where $$\rho(a) = \max_{\{b_n\}}\rho(a,\{b_n\}).$$

Similarly, the soft values for bit $b_{nm}$, $n=0,\ldots,N-1$ and $m=0,\ldots,B-1$ are given by:

$$\lambda(b_{nm}) =$$
$$\log\sum_{a,\{b_n\}:b_{na}=1}\exp\left(\frac{1}{N_0}\rho(a,\{b_n\})\right) - \log\sum_{a',\{b_n'\}:b_{nm}'=0}\exp\left(\frac{1}{N_0}\rho(a',\{b_n'\})\right) \approx$$
$$\frac{1}{N_0}\left[\max_a\rho(a,b_{nm}=1) - \max_{a'}\rho(a',b_{nm}==0)\right]$$

where $$\rho(a,b_{nm}=b) = \max_{\{b_n\}:b_{nm}=b}\rho(a,\{b_n\}).$$

After detailed deduction for QPSK, 16QAM and 64QAM, a final expression is derived as follows. It should also be clear to those skilled in the art that the teaching of this invention can be applied to different labeling or normalization of the modulation alphabets. Thus, the invention covers those computation methods and apparatus irrespective of superficially different calculation terms.

For QPSK Modulation:
  For selection (a) bits:

$$\rho(a) = \sum_{n=0}^{N-1}\sqrt{2}\left(|\text{Re}\{h_{a,n}^H r_n\}| + |\text{Im}\{h_{a,n}^H r_n\}|\right) - \sum_{n=0}^{N-1}\|h_{a,n}\|^2$$

For modulation (b) bits:

$$\rho(a,b_{n0}=1) = \rho(a) - 2\sqrt{2}(Re\{h_{a,n}^H r_n\}).$$

$$\rho(a,b_{n0}=0) = \rho(a) - 2\sqrt{2}(Re\{h_{a,n}^H r_n\}).$$

The expressions for $\rho(a,b_{n1}=1)$ and $\rho(a,b_{n1}=0)$ are obtained by replacing $\text{Re}\{h_{a,n}^H r_n\}$ with $\text{Im}\{h_{a,n}^H r_n\}$ in the above two equations, respectively. Hence:

$$(x)_+ = \max(0,x) = \frac{1}{2}(|x|+x)$$

$$(x)_- = \max(0,-x) = \frac{1}{2}(|x|-x).$$

For 16QAM Modulation:
  For selection (a) bits:

$$\rho(a) = \sum_{n=0}^{N-1}\sqrt{\frac{2}{5}}\begin{bmatrix}2|\text{Re}\{h_{a,n}^H r_n\}| + \left||\text{Re}\{h_{a,n}^H r_n\}| - \sqrt{2/5}\|h_{a,n}\|^2\right| + \\ 2|\text{Im}\{h_{a,n}^H r_n\}| + \left||\text{Im}\{h_{a,n}^H r_n\}| - \sqrt{2/5}\|h_{a,n}\|^2\right|\end{bmatrix} - \sum_{n=0}^{N-1}\|h_{a,n}\|^2.$$

For modulation (b) bits:

$$\rho(a,b_{n0}=1) =$$
$$\rho(a) - 2\sqrt{\frac{2}{5}}\left[(\text{Re}\{h_{a,n}^H r_n\})_+ + \left(\text{Re}\{h_{a,n}^H r_n\} - \sqrt{\frac{2}{5}}\|h_{a,n}\|^2\right)_+\right]$$

$$\rho(a,b_{n0}=0) = \rho(a) - 2\sqrt{\frac{2}{5}}\left[(\text{Re}\{h_{a,n}^H r_n\})_- + \left(\text{Re}\{h_{a,n}^H r_n\} - \sqrt{\frac{2}{5}}\|h_{a,n}\|^2\right)_-\right]$$

The expressions for $\rho(a,b_{n1}=1)$ and $\rho(a,b_{n1}=0)$ are obtained by replacing $\text{Re}\{f_{a,n}^H r_n\}$ with $\text{Im}\{h_{a,n}^H r_n\}$ in the above two equations, respectively. Hence:

$$\rho(a,b_{n2}=1) = \rho(a) - 2\sqrt{\frac{2}{5}}\left(|\text{Re}\{h_{a,n}^H r_n\}| - \sqrt{\frac{2}{5}}\|h_{a,n}\|^2\right)_-$$

$$\rho(a,b_{n2}=0) = \rho(a) - 2\sqrt{\frac{2}{5}}\left(|\text{Re}\{h_{a,n}^H r_n\}| - \sqrt{\frac{2}{5}}\|h_{a,n}\|^2\right)_+$$

The expressions for $\rho(a,b_{n3}=1)$ and $\rho(a,b_{n3}=0)$ are obtained by replacing $\text{Re}\{h_{a,n}^H r_n\}$ with $\text{Im}\{h_{a,n}^H r_n\}$ in above two equations, respectively.

For 64QAM Modulation:
  For selection (a) bits:

$$\rho(a) = \sum_{n=0}^{N-1}\sqrt{\frac{2}{21}}$$

$$\begin{bmatrix}4|\text{Re}\{h_{a,n}^H r_n\}| + \left||\text{Re}\{h_{a,n}^H r_n\}| - \sqrt{2/21}\|h_{a,n}\|^2\right| + \\ \left||\text{Re}\{h_{a,n}^H r_n\}| - 2\sqrt{2/21}\|h_{a,n}\|^2\right| + \\ \left||\text{Re}\{h_{a,n}^H r_n\}| - 3\sqrt{2/21}\|h_{a,n}\|^2\right| + \\ 4|\text{Im}\{h_{a,n}^H r_n\}| + \left||\text{Im}\{h_{a,n}^H r_n\}| - \sqrt{2/21}\|h_{a,n}\|^2\right| + \\ \left||\text{Im}\{h_{a,n}^H r_n\}| - 2\sqrt{2/21}\|h_{a,n}\|^2\right| + \\ \left||\text{Im}\{h_{a,n}^H r_n\}| - 3\sqrt{2/21}\|h_{a,n}\|^2\right|\end{bmatrix} - \frac{25}{21}\sum_{n=0}^{N-1}\|h_{a,n}\|^2$$

For modulation (b) bits:

$$\rho(a, b_{n0} = 1) = $$

$$\rho(a) - 2\sqrt{\frac{2}{21}} \begin{bmatrix} (\text{Re}\{h_{a,n}^H r_n\})_+ + (\text{Re}\{h_{a,n}^H r_n\} - \sqrt{2/21} \|h_{a,n}\|^2)_+ + \\ (\text{Re}\{h_{a,n}^H r_n\} - 2\sqrt{2/21} \|h_{a,n}\|^2)_+ + \\ (\text{Re}\{h_{a,n}^H r_n\} - 3\sqrt{2/21} \|h_{a,n}\|^2)_+ \end{bmatrix}$$

$$\rho(a, b_{n0} = 0) = $$

$$\rho(a) - 2\sqrt{\frac{2}{21}} \begin{bmatrix} (\text{Re}\{h_{a,n}^H r_n\})_- + (\text{Re}\{h_{a,n}^H r_n\} + \sqrt{2/21} \|h_{a,n}\|^2)_- + \\ (\text{Re}\{h_{a,n}^H r_n\} + 2\sqrt{2/21} \|h_{a,n}\|^2)_- + \\ (\text{Re}\{h_{a,n}^H r_n\} + 3\sqrt{2/21} \|h_{a,n}\|^2)_- \end{bmatrix}$$

The expressions for $\rho(a,b_{n1}=1)$ and $\rho(a,b_{n1}=0)$ are obtained by replacing $\text{Re}\{h_{a,n}^H r_n\}$ with $\text{Im}\{h_{a,n}^H r_n\}$ in above two equations, respectively. Hence:

$$\rho(a, b_{n2} = 1) = $$

$$\rho(a) - \sqrt{\frac{2}{21}} \begin{bmatrix} -2|\text{Re}\{h_{a,n}^H r_n\}| + \left||\text{Re}\{h_{a,n}^H r_n\}| - \sqrt{2/21} \|h_{a,n}\|^2\right| + \\ \left||\text{Re}\{h_{a,n}^H r_n\}| - 2\sqrt{2/21} \|h_{a,n}\|^2\right| + 3\sqrt{2/21} \|h_{a,n}\|^2 \end{bmatrix}$$

$$\rho(a, b_{n2} = 0) = $$

$$\rho(a) - \sqrt{\frac{2}{21}} \begin{bmatrix} 2|\text{Re}\{h_{a,n}^H r_n\}| + \left||\text{Re}\{h_{a,n}^H r_n\}| - 2\sqrt{2/21} \|h_{a,n}\|^2\right| + \\ \left||\text{Re}\{h_{a,n}^H r_n\}| - 3\sqrt{2/21} \|h_{a,n}\|^2\right| - 5\sqrt{2/21} \|h_{a,n}\|^2 \end{bmatrix}$$

The expressions for $\rho(a,b_{n3}=1)$ and $\rho(a,b_{n3}=0)$ are obtained by replacing $\text{Re}\{h_{a,n}^H r_n\}$ with $\text{Im}\{h_{a,n}^H r_n\}$ in above two equations, respectively. Hence:

$$\rho(a, b_{n4} = 1) = \rho(a) - \sqrt{\frac{2}{21}} \begin{bmatrix} \left||\text{Re}\{h_{a,n}^H r_n\}| - \sqrt{2/21} \|h_{a,n}\|^2\right| - \\ 2\left||\text{Re}\{h_{a,n}^H r_n\}| - \sqrt{2/21} \|h_{a,n}\|^2\right| + \\ \left||\text{Re}\{h_{a,n}^H r_n\}| - 3\sqrt{2/21} \|h_{a,n}\|^2\right| \end{bmatrix}$$

$$\rho(a, b_{n4} = 0) = \rho(a) - \sqrt{\frac{2}{21}} \begin{bmatrix} \left||\text{Re}\{h_{a,n}^H r_n\}| - \sqrt{2/21} \|h_{a,n}\|^2\right| + \\ \left||\text{Re}\{h_{a,n}^H r_n\}| - 3\sqrt{2/21} \|h_{a,n}\|^2\right| - \\ 2\sqrt{2/21} \|h_{a,n}\|^2 \end{bmatrix}$$

The expressions for $\rho(a,b_{n3}=1)$ and $\rho(a,b_{n3}=0)$ are obtained by replacing $\text{Re}\{h_{a,n}^H r_n\}$ with $\text{Im}\{h_{a,n}^H r_n\}$ in above two equations, respectively.

Figure 3A:
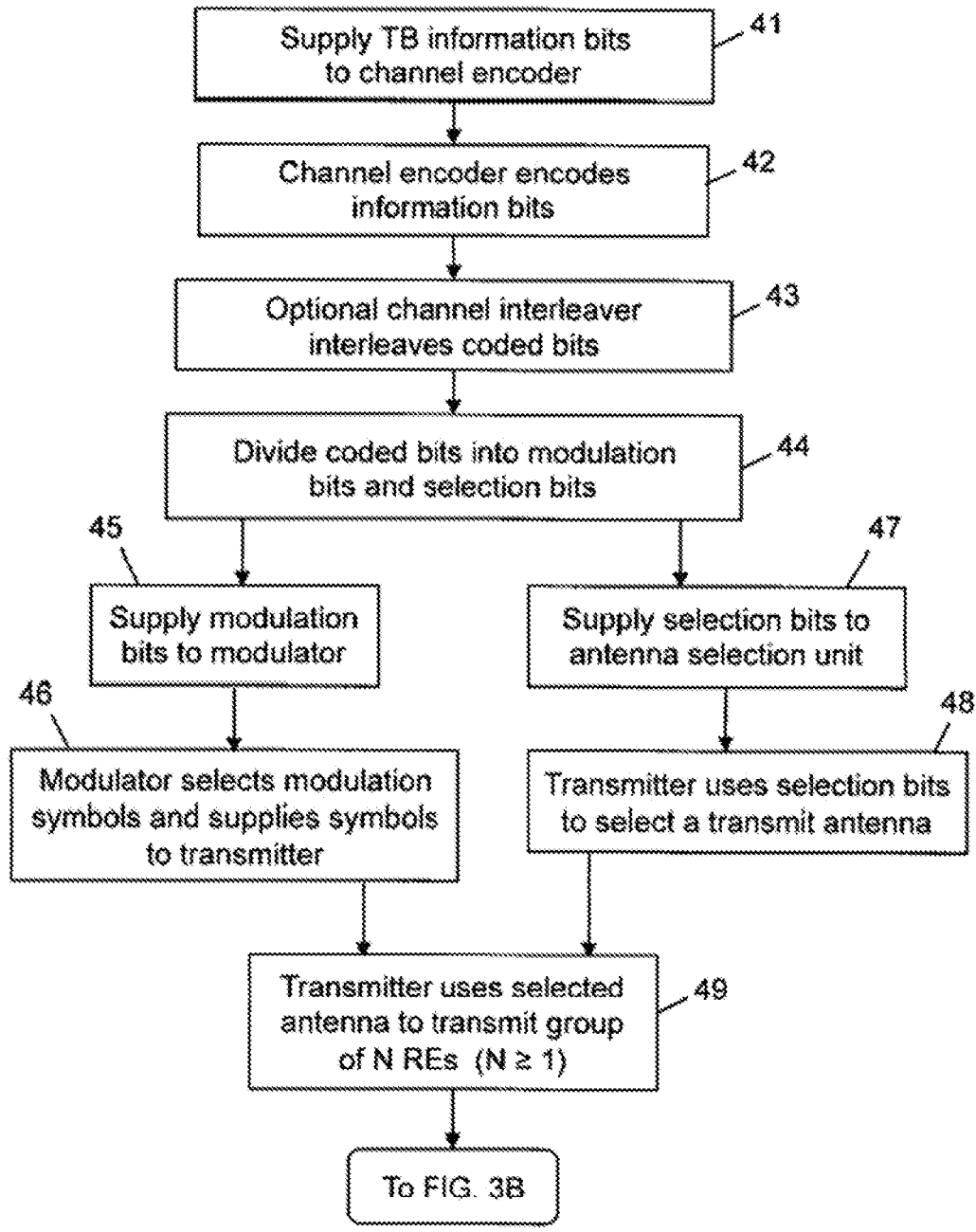
FIGS. 3A-3B are portions of a flow chart illustrating the steps of an embodiment of the method of the present invention.
Figure 3B:
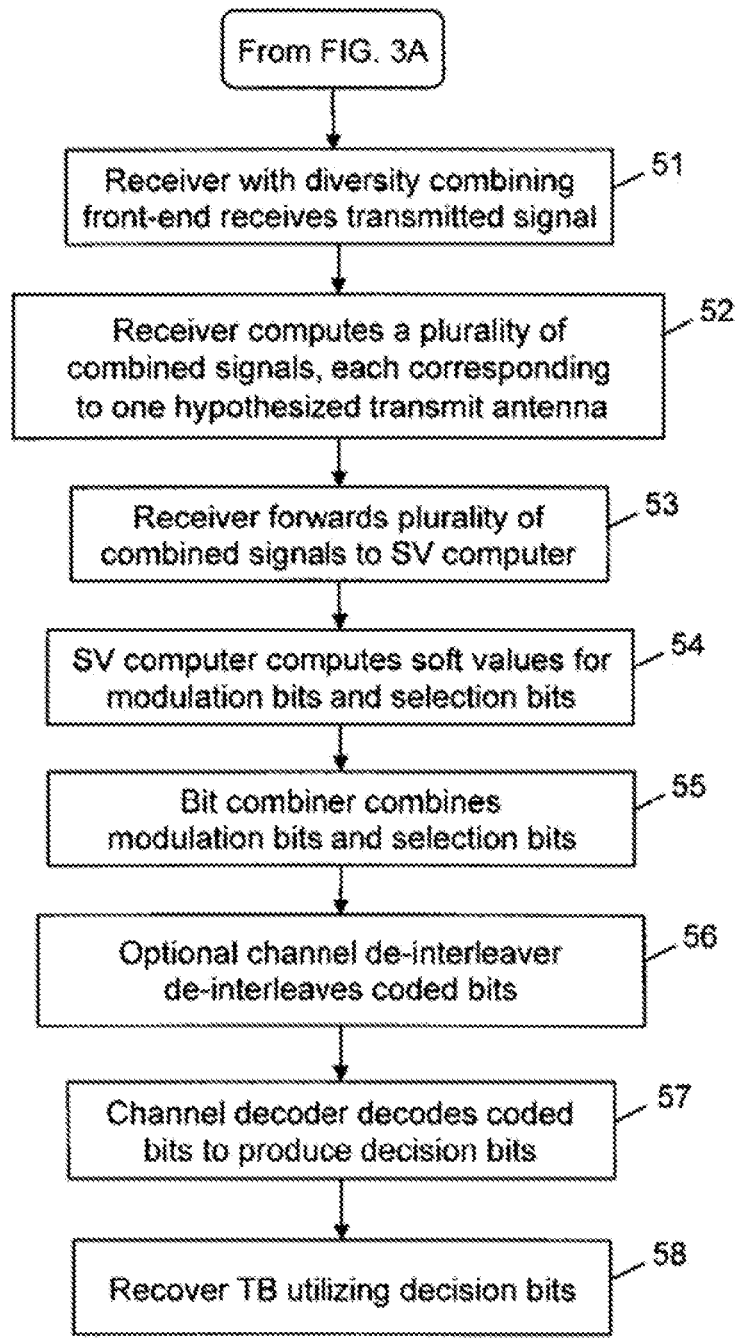

FIGS. 3A-3B are portions of a flow chart illustrating the steps of an embodiment of the method of the present invention. FIG. 3A illustrates steps performed by the transmitter node 11. At step 41, the information bits in a TB 28 are supplied to the channel encoder 13. At step 42, the channel encoder, which may be for example a turbo coder, encodes the information bits. At step 43, the optional channel interleaver 14 interleaves the coded bits. At step 44, the bit divider 15 divides the coded bits into Part 1 and Part 2 (i.e., selection bits and modulation bits, respectively). At step 45, the modulation bits are supplied to the modulator 16. At step 46, the modulator selects modulation symbols to be transmitted and supplies them to the transmitter 17.

In parallel with supplying the modulation bits to the modulator 16, the selection bits are supplied at step 47 to the antenna selection unit 18 in the transmitter 17. At step 48, the antenna selection unit utilizes the selection bits to select a transmit antenna 19. At step 49, the transmitter then uses the selected antenna to orthogonally transmit the modulation symbols supplied by the modulator 16. In particular, the transmitter transmits a group of N REs, where N≥1. The method then moves to FIG. 3B.

FIG. 3B illustrates steps performed by the receiver node 12. At step 51, the diversity combining front-end receiver 22 receives the transmitted signal. At step 52, the receiver computes a plurality of combined signals, each combined signal corresponding to one hypothesized transmit antenna at the transmitter node. At step 53, the receiver forwards the plurality of combined signals to the SV computer 24. At step 54, the SV computer computes soft values for both the modulation bits and the selection bits utilizing the plurality of combined signals. At step 55, the bit combiner 25 combines the modulation bits and the selection bits. At step 56, the optional channel de-interleaver 26 de-interleaves the coded bits. At step 57, the channel decoder 27, which may be for example a turbo decoder, decodes the coded bits to produce decoded decision bits. At step 58, the TB is then recovered utilizing the decoded decision bits.

In performance evaluations, the SSC coding scheme of the present invention was compared to the conventional SFBC coding schemes. Comparisons were made based on 2 or 4 transmit antennas. The same spectrum efficiency was set for all schemes. The binary coding rate of the SSC coding scheme was fixed at $r_c$=0.4, and the binary coding rate of the conventional SFBC coding schemes was varied to match the spectral efficiency of the SCC coding scheme. The results showed that, given the same spectral efficiency, the SSC coding scheme can provide strong error protection through a lower binary coding rate than the conventional SFBC coding schemes. Block Error Rate (BLER) performance indicated that for the 2×2 configuration, the SCC and the SFBC coding schemes have similar performance, while for the 4×2 configuration, the SSC coding scheme achieves clearly better performance than the conventional SFBC coding schemes.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of communicating a transport block of information bits from a transmitter node to a receiver node, wherein the transmitter node includes a channel encoder for encoding the information bits, a modulator for receiving coded information bits and selecting modulation symbols, and a transmitter for transmitting the modulation symbols in a radio signal through a transmit antenna, and wherein the receiver node includes a diversity combining front-end receiver for receiving the radio signal, and a channel decoder for decoding the coded information bits, the method comprising the steps of:

after encoding the information bits by the channel encoder, dividing the coded bits into a first part comprising antenna selection bits and a second part comprising modulation bits;

utilizing the antenna selection bits by an antenna selection unit to select a transmit antenna from a plurality of transmit antennas;

utilizing the modulation bits by the modulator to select modulation symbols for transmission in the radio signal; and transmitting the radio signal by the transmitter utilizing the selected antenna;

wherein the step of transmitting the radio signal includes transmitting an orthogonal frequency division multiplexed, OFDM radio signal, which includes a group of N resource elements defined in time and frequency domains, where N is an integer greater than or equal to 1, and wherein the group of N resource elements includes a plurality of resource elements located consecutively in the frequency domain.

2. The method as recited in claim 1, further comprising the steps of:

receiving the radio signal by the diversity combining front-end receiver;

computing by the receiver, a plurality of combined signals, each combined signal corresponding to one hypothesized transmit antenna at the transmitter node;

forwarding the plurality of combined signals to a soft value computer; and computing by the soft value computer, soft values for both the modulation bits and the selection bits utilizing the plurality of combined signals.

3. The method as recited in claim 2, further comprising the steps of:

combining the soft values for the antenna selection bits and the modulation bits;

decoding the combined soft values by the channel decoder to produce decoded decision bits; and utilizing the decoded decision bits to recover the transport block of information bits.

4. A transmitter node for transmitting a transport block of information bits to a receiver node, wherein the transmitter node includes a channel encoder for encoding the information bits, a modulator for receiving the coded information bits and selecting modulation symbols, and a transmitter for transmitting the modulation symbols in a radio signal through a transmit antenna, wherein the transmitter node comprises:

a bit divider configured to divide the encoded bits into a first part comprising antenna selection bits and a second part comprising modulation bits, wherein the antenna selection bits are provided to the transmitter and the modulation bits are provided to the modulator; and an antenna selection unit in the transmitter for utilizing the antenna selection bits to select from a plurality of transmit antennas, a transmit antenna for transmitting the radio signal;

wherein the transmitter transmits an orthogonal frequency division multiplexed, OFDM, radio signal, which includes a group of N resource elements defined in time and frequency domains, where N is an integer greater than or equal to 1; and wherein the group of N resource elements includes a plurality of resource elements located consecutively in the frequency domain.

5. A receiver node for receiving a radio signal from a transmitter node, and for recovering a transport block of information bits from the radio signal, wherein the transmitter node encodes the information bits, divides the coded bits into antenna selection bits and modulation bits, utilizes the antenna selection bits to select a transmit antenna from a plurality of transmit antennas, and utilizes the modulation bits to select modulation symbols for transmission, and wherein the receiver node includes a receiver for receiving the radio signal, and a channel decoder for decoding the coded information bits, wherein the receiver node comprises:

a diversity combining front-end receiver for receiving the radio signal, and for computing a plurality of combined signals, each combined signal corresponding to one hypothesized transmit antenna at the transmitter node; and a soft value computer for receiving the plurality of combined signals from the receiver, and for computing soft values for the antenna selection bits and modulation bits utilizing the plurality of combined signals;

wherein the receiver node further comprises:

a bit combiner for combining the soft values for the selection bits and the modulation bits prior to decoding;

wherein the channel decoder decodes the combined soft values to produce decoded decision bits; and wherein the decoded decision bits are utilized to recover the transport block of information bits.

6. A method of communicating a transport block of information bits from a transmitter node to a receiver node, wherein the transmitter node includes a channel encoder for encoding the information bits, a modulator for receiving coded information bits and selecting modulation symbols, and a transmitter for transmitting the modulation symbols in a radio signal through a transmit antenna, and wherein the receiver node includes a diversity combining front-end receiver for receiving the radio signal, and a channel decoder for decoding the coded information bits, the method comprising the steps of:

after encoding the information bits by the channel encoder, dividing the coded bits into a first part comprising antenna selection bits and a second part comprising modulation bits;

utilizing the antenna selection bits by an antenna selection unit to select a transmit antenna from a plurality of transmit antennas;

utilizing the modulation bits by the modulator to select modulation symbols for transmission in the radio signal; and transmitting the radio signal by the transmitter utilizing the selected antenna;

wherein the step of transmitting the radio signal includes transmitting an orthogonal frequency division multiplexed, OFDM radio signal, which includes a group of N resource elements defined in time and frequency domains, where N is an integer greater than or equal to 1, and wherein the group of N resource elements includes a plurality of resource elements located non-consecutively in the frequency domain.

7. A method of communicating a transport block of information bits from a transmitter node to a receiver node, wherein the transmitter node includes a channel encoder for encoding the information bits, a modulator for receiving coded information bits and selecting modulation symbols, and a transmitter for transmitting the modulation symbols in a radio signal through a transmit antenna, and wherein the receiver node includes a diversity combining front-end receiver for receiving the radio signal, and a channel decoder for decoding the coded information bits, the method comprising the steps of:

after encoding the information bits by the channel encoder, dividing the coded bits into a first part comprising antenna selection bits and a second part comprising modulation bits;

utilizing the antenna selection bits by an antenna selection unit to select a transmit antenna from a plurality of transmit antennas;

utilizing the modulation bits by the modulator to select modulation symbols for transmission in the radio signal; and transmitting the radio signal by the transmitter utilizing the selected antenna;

wherein the method further comprises:

receiving the radio signal by the diversity combining front-end receiver;

computing by the receiver, a plurality of combined signals, each combined signal corresponding to one hypothesized transmit antenna at the transmitter node;

forwarding the plurality of combined signals to a soft value computer; and computing by the soft value computer, soft values for both the modulation bits and the selection bits utilizing the plurality of combined signals.

8. The method as recited in claim 7, further comprising the steps of:

combining the soft values for the antenna selection bits and the modulation bits;

decoding the combined soft values by the channel decoder to produce decoded decision bits; and utilizing the decoded decision bits to recover the transport block of information bits.

9. A transmitter node for transmitting a transport block of information bits to a receiver node, wherein the transmitter node includes a channel encoder for encoding the information bits, a modulator for receiving the coded information bits and selecting modulation symbols, and a transmitter for transmitting the modulation symbols in a radio signal through a transmit antenna, wherein the transmitter node comprises:

a bit divider configured to divide the encoded bits into a first part comprising antenna selection bits and a second part comprising modulation bits, wherein the antenna selection bits are provided to the transmitter and the modulation bits are provided to the modulator; and an antenna selection unit in the transmitter for utilizing the antenna selection bits to select from a plurality of transmit antennas, a transmit antenna for transmitting the radio signal;

wherein the transmitter transmits an orthogonal frequency division multiplexed, OFDM, radio signal, which includes a group of N resource elements defined in time and frequency domains, where N is an integer greater than or equal to 1; and wherein the group of N resource elements includes a plurality of resource elements located non-consecutively in the frequency domain.

\* \* \* \* \*

UNITED STATES PATENT AND TRADEMARK OFFICE
CERTIFICATE OF CORRECTION

PATENT NO. : 9,088,456 B2
APPLICATION NO. : 13/641788
DATED : July 21, 2015
INVENTOR(S) : Cheng et al.

It is certified that error appears in the above-identified patent and that said Letters Patent is hereby corrected as shown below:

In the specification

In Column 6, Line 20, delete "$SE_{SSC} = \left(1 + \frac{1}{N}\log_Q N_r\right) r_c \log_2 Q.$" and insert -- $SE_{SSC} = \left(1 + \frac{1}{N}\log_Q N_T\right) r_c \log_2 Q$ --, therefor.

In Column 6, Line 60, delete "$r_n = h_{a,n} s_{b_n} - w_n, n = 0, \ldots, N-1$" and insert -- $\mathbf{r}_n = \mathbf{h}_{a,n} s_{b_n} + \mathbf{w}_n, n = 0, \ldots, N-1$ --, therefor.

In Column 6, Line 64, delete "$E[\|\mathbf{h}_{a,n}\|]^2 = N_R E_s,$" and insert -- $E\left[\|\mathbf{h}_{a,n}\|^2\right] = N_R E_s$ --, therefor.

In Column 7, Line 5, delete "$\log Pr(\{r_n\} | a, \{b_n\}, \{h_{a,n}\}) = \frac{1}{N_0} p(a, \{b_n\}) - \frac{1}{N_0} \sum_{n=0}^{N-1} \|r_n\|^2 - NN_R \log \pi N_0$" and insert -- $\log \Pr\left(\{\mathbf{r}_n\} | a, \{\mathbf{b}_n\}, \{\mathbf{h}_{a,n}\}\right) = \frac{1}{N_0} \rho(a, \{\mathbf{b}_n\}) - \frac{1}{N_0} \sum_{n=0}^{N-1} \|\mathbf{r}_n\|^2 - NN_R \log \pi N_0$ --, therefor.

In Column 7, Line 15, delete "$a_m = 0, \ldots, A-1,$" and insert -- $a_m, m = 0, \ldots, A-1$ --, therefor.

In Column 7, Line 61, after Equation, insert -- , --, therefor.

Signed and Sealed this
Ninth Day of February, 2016

Michelle K. Lee
*Director of the United States Patent and Trademark Office*

CERTIFICATE OF CORRECTION (continued)
U.S. Pat. No. 9,088,456 B2

In the specification

In Column 7, Line 64, delete "$\rho(a, b_{n0} = 0) \ \rho(a) - 2\sqrt{2}(Re\{h_{a,n}{}^H r_n\})$," and insert -- $\rho(\mathbf{a}, b_{n0} = 0) = \rho(\mathbf{a}) - 2\sqrt{2}\left(\text{Re}\{\mathbf{h}_{\mathbf{a},n}^H \mathbf{r}_n\}\right)_{-}$ --, therefor.

In Column 8, Line 34, delete "$\text{Re}\{\mathbf{f}_{a,n}{}^H \mathbf{r}_n\}$" and insert -- $\text{Re}\{\mathbf{h}_{\mathbf{a},n}^H \mathbf{r}_n\}$ --, therefor.

In Column 8, Line 40, delete "$\rho(a, b_{n2} = 1) = \rho(a) - 2\sqrt{\frac{2}{5}}\left(|\text{Re}\{h_{a,n}^H r_n\}| - \sqrt{\frac{2}{5}}\|h_{a,n}\|^2\right)$" and insert -- $\rho(\mathbf{a}, b_{n2} = 1) = \rho(\mathbf{a}) - 2\sqrt{\frac{2}{5}}\left(\left|\text{Re}\{\mathbf{h}_{\mathbf{a},n}^H \mathbf{r}_n\}\right| - \sqrt{2/5}\|\mathbf{h}_{\mathbf{a},n}\|^2\right)_{-}$ --, therefor.

In Column 9, Lines 13-15, delete "$\rho(a) - 2\sqrt{\frac{2}{21}}\begin{bmatrix}(\text{Re}\{h_{a,n}^H r_n\})_{-} + (\text{Re}\{h_{a,n}^H r_n\} + \sqrt{2/21}\|h_{a,n}\|^2)_{-} + \\ (\text{Re}\{h_{a,n}^H r_n\} + 2\sqrt{2/21}\|h_{a,n}\|^2) + \\ (\text{Re}\{h_{a,n}^H r_n\} + 3\sqrt{2/21}\|h_{a,n}\|^2)\end{bmatrix}$" and insert -- $\rho(\mathbf{a}, b_{n0} = 0) = \rho(\mathbf{a}) - 2\sqrt{\frac{2}{21}}\begin{bmatrix}\left(\text{Re}\{\mathbf{h}_{\mathbf{a},n}^H \mathbf{r}_n\}\right)_{-} + \left(\text{Re}\{\mathbf{h}_{\mathbf{a},n}^H \mathbf{r}_n\} + \sqrt{2/21}\|\mathbf{h}_{\mathbf{a},n}\|^2\right)_{-} + \\ \left(\text{Re}\{\mathbf{h}_{\mathbf{a},n}^H \mathbf{r}_n\} + 2\sqrt{2/21}\|\mathbf{h}_{\mathbf{a},n}\|^2\right)_{-} + \left(\text{Re}\{\mathbf{h}_{\mathbf{a},n}^H \mathbf{r}_n\} + 3\sqrt{2/21}\|\mathbf{h}_{\mathbf{a},n}\|^2\right)_{-}\end{bmatrix}$ --, therefor.

In Column 9, Line 50, delete "$\rho(a, b_{n3} = 1)$ and $\rho(a, b_{n3} = 0)$," and insert -- $\rho(\mathbf{a}, b_{n5} = 1)$ and $\rho(\mathbf{a}, b_{n5} = 0)$ --, therefor.